Figure 1:
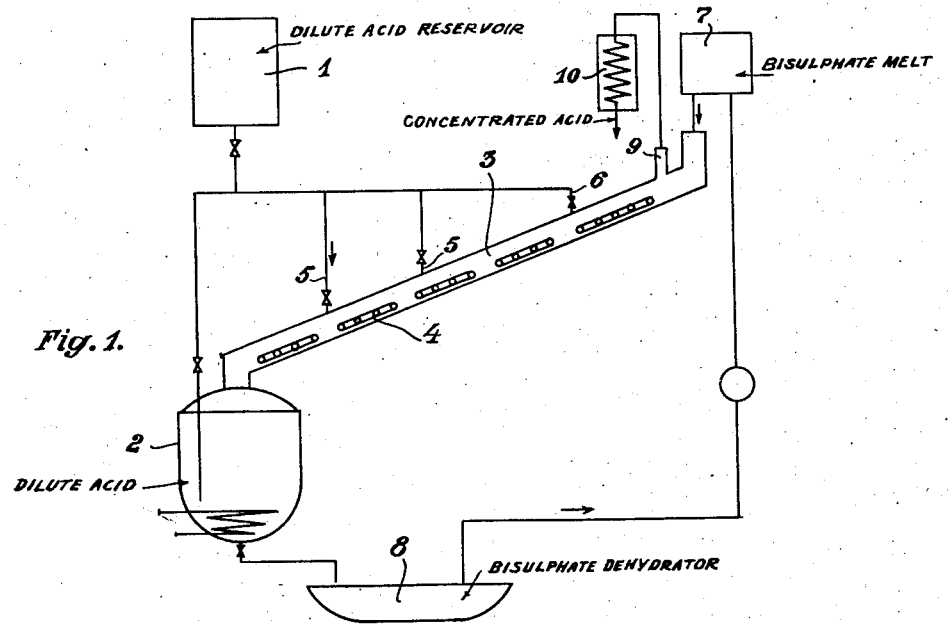

June 2, 1931.  A. GORHAN  1,808,600

PROCESS FOR CONCENTRATING VOLATILE ALIPHATIC ACIDS

Filed May 26, 1928

ADOLF GORHAN
By
Atty

Patented June 2, 1931

1,808,600

UNITED STATES PATENT OFFICE

ADOLF GORHAN, OF LIESING, NEAR VIENNA, AUSTRIA, ASSIGNOR, BY MESNE ASSIGNMENTS, TO THE FIRM OF DEUTSCHE GOLD- UND SILBER-SCHEIDEANSTALT VORMALS ROESSLER, OF FRANKFORT-ON-THE-MAIN, GERMANY, A CORPORATION OF GERMANY

PROCESS FOR CONCENTRATING VOLATILE ALIPHATIC ACIDS

Application filed May 26, 1928, Serial No. 280,909, and in Germany June 16, 1927.

This invention relates to a process for concentrating volatile aliphatic acids, as for example, acetic acid, propionic acid and the like. The process according to the invention is, for example, carried out by treating the acid to be concentrated, for example, dilute acetic acid, with fused sodium bisulphate, preferably in such a way that the acid, in the form of vapour, or, suitably, partially in the form of vapour and partially liquid, is brought into contact with the bisulphate melt or mixtures containing the same under conditions favouring the combination of water with the bisulphate melt or mixtures.

It has been further found that the water-absorbing power of the bisulphate at the temperatures employed for the process may be increased in a surprising manner by adding small quantities of sulphuric acid, for example such amounts as increase the content in sulphuric acid according to the formula-composition of the salt by only a small percentage. Disadvantages such as appear when using concentrated sulphuric acid as a dehydrating agent do not in this case occur.

As the bisulphate melts employed for fixing the water lose their water-fixing property when certain temperatures are exceeded it is advisable to keep the melting point of the salt as low as possible. This can, for example, be effected by suitably combining constituents of the melts, for example, by adding other salts especially potassium bisulphate or by introducing other admixtures capable of lowering the melting point. The presence of small quantities of water has, for example, proved to be advantageous. It is, therefore, advisable not to start with an entirely dehydrated bisulphate, but to employ one which contains about 3-4% of water.

The process according to the invention may, for example, be carried into effect by subjecting the acid to be concentrated to distillation and bringing the vapour, which comes over, into contact with bisulphate melts, suitably for example, by passing the vapour under suitable conditions in a counter-current over the fused salt. In this case the process is with advantage effected by treating the liquid acid to be distilled with water-fixing substances or mixtures of substances, as for example, bisulphate or sulphuric acid or mixtures of both.

The concentration process may, for example, be carried out by subjecting the dilute acid, for example aqueous acetic acid, in the presence or absence of dehydrating agents of the above mentioned kind, to distillation and by leading the issuing vapours through a slightly inclined channel, through which fused bisulphate flows in a counter direction to the stream of vapour. The vapour coming off is collected and condensed at the upper end of the channel. The bisulphate melt, which has taken up water, may, for example, be allowed to flow directly into the distillation vessel for the dilute acid, where it can again act as a dehydrating agent. The bisulphate-water mixtures can be from time to time or continuously removed from the distillation vessel and, after being dehydrated, be again introduced into the process, i. e. in this case in the upper part of the channel. Another method of procedure is, for example, to interrupt the introduction of fresh aqueous acid after a considerable quantity of the bisulphate-water mixture has accumulated in the distillation vessel, to distill off the acid left in the distillation vessel, then to close the outlet to the channel and finally to drive the water out of the bisulphate. The dehydrated bisulphate melt may then be pumped into a receptacle connected with the upper part of the channel and be again led from there to the channel.

In place of a channel other apparatus or devices can also be employed. An especially effective method is, for example, to use columns, especially so-called capsule columns, which may be employed alone or in combination with a connected distillation vessel. In this case the individual chambers of the columns, charged with bisulphate melts, are with advantage furnished with devices, such as coils, which enable the desired temperatures to be maintained, being, for example, cooled by the passage of water or, if necessary, heated by the passage of steam.

According to one method of carrying out the process according to the invention the acid to be concentrated is brought into contact with the fused bisulphate in a liquid condition, care being taken to prevent the acid from previously vapourizing, for example, by leading the bisulphate melt through a channel, column or the like, and introducing at one or more points the acid to be concentrated, if necessary in different stages of concentration, in a suitable form, if desired in the form of a spray, or in an atomized condition.

An especially advantageous method, however, is to bring the acid, partially in the form of vapour, partially in the liquid condition, into contact with the melt. When a channel or a capsule column is employed, the acid, suitably in the presence of dehydrating agents, for example, disulphate, is subjected to distillation and the vapour, which comes off, led through the channel or column in the above described manner, and in this way brought into contact with the bisulphate melt, whilst at the same time liquid aqueous acid is introduced at suitable points of the channel or column, especially at the points requiring to be cooled. In this way the advantage is obtained that the considerable amount of heat of condensation developed in the channel or column is not removed by outer cooling and thereby lost, but that the heat removed, is effected by the aqueous acid introduced in a liquid condition into the apparatus whereby the latter is at the same time concentrated. The process may, for example, be effected by introducing very dilute acids, for example 10% acetic acid, at the points of the channel or column nearest to the distillation vessel, whilst acid of higher concentration is suitably introduced at the more remote points, especially near the outlet.

The process has proved to be especially suitable for the concentration of dilute acetic acid of any origin and concentration, for example, fermentation acetic acid, especially, however, of crude pyroligneous acid. When the last named starting materials are employed it has in some cases proved to be suitable to remove from the crude pyroligneous acid the tarry and oily constituents, as the latter may have a detrimental effect by coating the apparatus or the charge with tar, etc. This can be effected in a manner known per se, for example, by introducing salts, such as bisulphate or suitable salt mixtures, into the crude pyroligneous acid and by aiding the separation of the said constituents, if necessary by warming, or by subjecting the crude pyroligneous acid to a boiling process under pressure, whereby the tarry constituents are coagulated and separated. It has been found that a particularly favourable tar removal may be effected by adding salts, such as bisulphate or salt-mixtures, to the pyroligneous acid, which has, if necessary, been previously de-alcoholized and subjecting the said pyroligneous acid in the presence of these salts, to heating under pressure, for example at about 5 atmospheres. In this way a very pale crude pyroligneous acid, almost completely free from tarry constituents, is obtained. The concentration process is with advantage effected simultaneously with the heating under pressure, for example, by subjecting the acid in a still hot condition, to the distillation process according to this invention. In this case it is unnecessary to saturate the crude pyroligneous acid with the salt. Smaller quantities, for example, 20–40% of sodium bisulphate are, on the contrary, sufficient. By the new combination of the methods of salt incorporation and heating under pressure already known per se a new effect, which was not to be foreseen, is obtained as in this way about double the quantity of tar can be separated as when the methods are employed individually. The combined purification process can also with advantage be employed for the purification of crude pyroligneous acid used for other purposes.

The concentration process can also with advantage be combined with the esterification of a part of the acid employed. Aqueous alcohol-containing acids, for example, non de-alcoholized methanol-containing crude pyroligneous acid is, for example, employed. If a starting material of this sort is subjected to the concentration process the acid employed is obtained partially in a concentrated form and partially in the form of the ester. The esterification can be effected in the liquid phase or in the vapour zone or in both phases and, if desired, even during the purification of the crude pyroligneous acid. If a stronger esterification is aimed at more alcohol may be added to the crude pyroligneous acid. The comparatively small quantities of acids left behind in the aqueous bisulphate solution can also with advantage be recovered by esterifying with suitable quantities of methyl alcohol, ethyl alcohol or the like.

Finally it has further been found that the concentration of the acetic acid may with advantage be combined with the removal of the formic acid present in the acetic acid. If, for example, an already concentrated acetic acid, for example, one of about 80–85%, which, for example, has been obtained by subjecting a dilute acetic acid, for example, crude pyroligneous acid to the above concentration process, is subjected to further concentration the acid being mixed according to the invention, with a bisulphate, which contains more sulphuric acid than corresponds to the formula $NaHSO_4$, an approximately 90–95% acetic acid, which is practically free from formic acid, is obtained. In carrying out this process greater quantities of sulphuric acid than those mentioned at the outset are preferably employed. A bisulphate melt, which contains up to 10% or more sulphuric acid than corresponds with the formula of the bisulphate may, for example, be employed.

The invention is illustrated by the following examples explained with reference to the accompanying drawings:

1. According to Fig. 1 of the drawings the acid to be concentrated, for example 10% acetic acid, is continuously introduced from the store vessel 1 into the still 2 and there vapourized in the presence or absence of water-fixing substances, for example bisulphate. The acid-steam mixture passes through the inclined channel 3, which is provided with cooling coils 4 and inlets 5 for the introduction of liquid aqueous acetic acid, which can also be fed from the store vessel 1. The liquid acid inlet pipe 6 nearest the upper end of the channel 3 is with advantage fed with acetic acid of a higher concentration. Fused bisulphate, which if desired may contain small quantities of sulphuric acid or water, is introduced from the container 7 into the upper portion of the channel 3 so that it flows in a counter-direction to the acetic acid vapour mixture. The temperature of the molten material is preferably so regulated that it decreases from the upper part of the channel downwards from 160° C. to 170° C. or more to, for example 130° C. to 120° C. or less. The bisulphate melt, with its increased water content flows from the lower portion of the channel 3 into the still 2 from which it is led into the bisulphate dehydrating vessel 8 and after dehydration can be pumped from there into the container 7, from which it is again circulated through the system. The acetic acid leaving by the connecting pipe 9 is condensed in the cooler 10. It is obtained in concentrations of about 80–85%.

2. According to Fig. 2 of the drawings the dilute acid, for example de-tarred pyroligneous acid is conveyed from the storing vessel 1 into the still 2 and vapourized. The acid-vapour mixture passes through the pipe 11 into the lower part of the column 12. The column 12 is furnished with trays 13, in which cooling or steam coils 14 are situated. Above each of the trays 13 inlet pipes 15 are provided for the liquid acid, which can also be fed from the storing vessel 1. The bisulphate melt enters at 16 into the upper portion of the column 12 and flows through the same from the top downwards. The aqueous bisulphate, which leaves the column at 17, can be led from here through the pipe 18 into the still 2 and from there into the bisulphate dehydrating vessel 8 or, can be led direct from the column through the pipe 19 into the bisulphate dehydrating vessel 8. The dehydrated bisulphate is pumped into the holder 7, from which it is again led into the upper portion of the column 12. The acetic acid vapour passes through the pipe 20 into the cooler 10. The condensed acetic acid is obtained as a solution, containing 80% and more of acetic acid.

Figure 2:
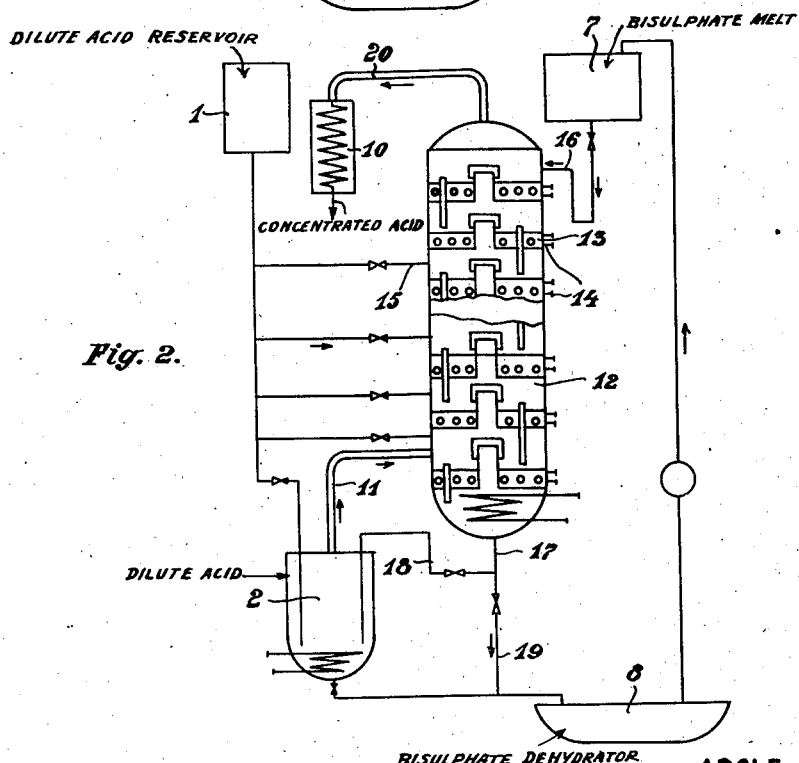

The apparatus shown in Fig. 2 can also, for example, be operated by cutting out the still 2, and leading the de-tarred pyroligneous acid directly through the pipe 15 into the column. In this case the lowest coil 21 may be employed as a heating coil.

In all the examples of carrying out the process the acid led in liquid form into the apparatus is also employed as a cooling agent. The introduction is, therefore, preferably effected with the object of producing as favourable a fall in temperature as possible. For the rest the cooling coils may be employed as supplementary temperature regulators. In case stoppages take place owing to interruptions in the operation any solidified melts can be again liquefied and discharged by using the coils as heating coils.

What I claim is:—

1. A process for the concentration of dilute acetic acid and its volatile higher homologous acids, which consists in converting the dilute acids into vapor, and then treating the resulting acid vapor and water vapor mixture with water absorbing material comprising sodium bisulfate in the liquid molten state.

2. A process as claimed in claim 1, in which the water absorbing material comprises a mixture of sodium bisulfate and potassium bisulfate in the liquid molten state.

3. A process as claimed in claim 1, in which the water absorbing material comprises a mixture of sodium bisulfate in the liquid molten state and a relatively small amount of sulfuric acid.

4. A process as claimed in claim 1 in which the water absorbing material comprises a mixture of molten sodium bisulfate, potassium bisulfate, and a relatively small amount of sulfuric acid.

5. A process as claimed in claim 1 in which the water absorbing material comprises hydrous sodium bisulfate in the liquid molten state.

6. A process as claimed in claim 1 in which the water absorbing material comprises a mixture of hydrous sodium bisulfate and hydrous potassium bisulfate in the liquid molten state.

7. A process as claimed in claim 1 in which the process is carried out in a column, the dilute acids being distilled in the lower portion of the column and the vapor mixture being brought into contact with molten liquid bisulfate in the upper portion of the column.

8. A process for the concentration of dilute acetic acid and its volatile higher homologous acids, which consists in partially converting the dilute acids into vapor, and then bringing the resulting mixture of liquid dilute acid, acid vapor and water vapor into contact with water absorbing material comprising sodium bisulfate in the liquid molten state.

9. A process as claimed in claim 1 in which the mixture of acid vapor and water vapor is brought into contact with the water absorbing material while being passed through a column, and in which dilute liquid acids are simultaneously introduced into the column.

10. A process for the concentration of dilute acetic acid and its volatile higher homologous acids, which consists in mixing the diluted acids with dehydrating agents distilling the resulting solution, and then bringing the resulting mixture of acid vapor and water vapor into contact with sodium bisulfate in the liquid molten state.

11. A process for the concentration of dilute acetic acid and its higher volatile homologous acids, which consists in converting the dilute acids into vapor form, and then treating the resulting acid vapor and water vapor mixture with water absorbing material comprising a mixture containing sodium bisulfate as a chief constituent, and another substance capable of reducing the melting point of the mixture below that of sodium bisulfate.

12. A process for the concentration of pyroligneous acid, which consists in distilling the pyroligneous acid, and then bringing the resulting mixture of acid vapor and water vapor into contact with sodium bisulfate in the liquid molten state.

13. A process for the concentration of pyroligneous acid which consists in treating said acid with tar removing substances, distilling the acid, and then bringing the resulting acid vapor and water vapor mixture into contact with sodium bisulfate in the liquid molten state.

14. A process for the concentration of acetic acid and its higher homologous acids, which consists in distilling dilute alcohol containing solutions of the acids, and then bringing the mixture of acid vapor, water vapor and alcohol into contact with sodium bisulfate in the liquid molten state.

15. A process for the concentration of acetic acid and its higher homologous acids, which consists in converting the dilute liquid acid into vapor form, treating the resulting mixture of acid vapor and water vapor with bisulfate in the liquid molten state, and then further concentrating the acids thus obtained by treatment with water absorbing material comprising sodium bisulfate in the presence of free sulphuric acid.

16. A process for the concentration of acetic acid and its higher homologous acids, which consists in converting the dilute acids into vapor form, treating the resulting acid vapor and water vapor mixture with a water absorbing agent comprising sodium bisulfate in the molten liquid state, and recovering the acid retained in the water absorbing agent by esterification.

In testimony whereof I affix my signature.

DR. ADOLF GORHAN.